United States Patent
Schulte et al.

(10) Patent No.: US 11,697,249 B2
(45) Date of Patent: Jul. 11, 2023

(54) LOAD INTRODUCTION DEVICE AND METHOD FOR ADHESIVE BONDING OF A LOAD INTRODUCTION DEVICE

(71) Applicant: Carbon Truck & Trailer GmbH, Stade (DE)

(72) Inventors: Benedikt Schulte, Hamburg (DE); Markus Bade, Hamburg (DE); Hauke Kühl, Hamburg (DE); Gerret Kalkoffen, Hamburg (DE); Jan Hadamus, Hamburg (DE)

(73) Assignee: CARBON TRUCK & TRAILER GMBH, Stade (DE)

( * ) Notice: Subject to any disclaimer, the term of this patent is extended or adjusted under 35 U.S.C. 154(b) by 485 days.

(21) Appl. No.: 16/274,950

(22) Filed: Feb. 13, 2019

(65) Prior Publication Data
US 2020/0047421 A1   Feb. 13, 2020

(30) Foreign Application Priority Data

Feb. 15, 2018   (DE) .......................... 102018103382.6
Feb. 4, 2019    (DE) .......................... 102019102738.1

(51) Int. Cl.
  *B29C 65/54*   (2006.01)
  *B29C 65/00*   (2006.01)
  *B62D 29/00*   (2006.01)
  *B29L 31/30*   (2006.01)

(52) U.S. Cl.
  CPC ...... *B29C 65/542* (2013.01); *B29C 66/30325* (2013.01); *B29C 66/721* (2013.01); *B29C 66/742* (2013.01); *B62D 29/005* (2013.01); *B29L 2031/3002* (2013.01)

(58) Field of Classification Search
  None
  See application file for complete search history.

(56) References Cited

U.S. PATENT DOCUMENTS

2014/0241790 A1*  8/2014  Woleader ............ B29C 66/3452
                                              403/270
2017/0241401 A1*  8/2017  Smith .................... B29C 66/301

FOREIGN PATENT DOCUMENTS

| DE | 102004001386 | 7/2005 |
| DE | 102008058389 | 5/2010 |
| DE | 102008058390 | 6/2010 |
| DE | 102012012298 | 12/2013 |
| DE | 102015219719 | 4/2017 |
| EP | 2888153      | 7/2015 |

OTHER PUBLICATIONS

EPO search report.*
Partial translation of EPO search report.*
https://web.archive.org/web/20170630152215/https://www.klebeprofi.net/klebe-anleitungen/faserverbundwerkstoffe-kleben/.

* cited by examiner

*Primary Examiner* — Christopher T Schatz
(74) *Attorney, Agent, or Firm* — Sand, Sebolt & Wernow Co., LPA (57) ABSTRACT

A load introduction device and a method for adhesive bonding of a load introduction device for fiber composite materials is disclosed. A sealant, particularly a first adhesive is used in the creation of a cavity and in the creation of a secured arrangement for the injection of adhesive into the cavity.

17 Claims, 6 Drawing Sheets

LOAD INTRODUCTION DEVICE AND METHOD FOR ADHESIVE BONDING OF A LOAD INTRODUCTION DEVICE

TECHNICAL FIELD

The invention relates to a load introduction device and a method for adhesive bonding of a load introduction device for fiber composite materials. Load introduction devices to admit forces into fiber composite materials are known in quantity from prior art, for example from DE 10 2015 219 719 A1 or EP 2 888 153 A1.

BACKGROUND

Background Information

Also known from DE 102004001386 B3, DE 102008058390 A1 and DE 102008058389 A1 is to fill a cavity completely surrounded, apart from an overflow opening and an injection opening, until the adhesive has filled up the overflow opening or has come out of same.

SUMMARY

The task of the invention is to improve the load introduction device of EP 2 888 153 A1 and the method for adhesive bonding. With it, for example a defined cavity and/or the use of low-viscosity adhesives should be made possible on vertical surfaces. Especially a load introduction device should be made possible which encloses two edges as a single piece. For example, a U-shaped cross section adhesion surface is made possible that at least partially surrounds a fiber composite material carrier on three sides.

Especially, it should also be possible to do an exact positioning and a defined and simple distribution of adhesive. Additionally or alternatively, it is the object of the invention to provide a method that is simple and uses less material, which nonetheless makes possible reproducible adhesions with high quality.

The object is attained by a method for connection of at least one fiber composite work piece especially a longitudinal member of a vehicle, with a load introduction device, especially a metallic load introduction device, including a. making available at least one fiber composite work piece, and making available a load introduction device having at least one adhesive surface, b. positioning the load introduction device relative to the at least one fiber composite work piece so that at least one cavity is produced between the at least one fiber composite work piece and the least one adhesive surface of the load introduction device, and securing the arrangement of fiber composite work piece and load introduction device in such a way that the arrangement is suited to withstand a first pressure in the cavity for at least a first time period and/or a first injection loading through injection of adhesive into the cavity, especially without permanent and/or temporary alteration of the arrangement, c. injection of adhesive at least at a second pressure in at least one second time period into the cavity, especially through a cutout or a plurality of cutouts, especially boreholes, in the load introduction device, i. until the adhesive reaches an expansion, especially one pre-planned, which is defined, especially at least partially, especially over at least 10% of the contour of the adhesive expansion in the cavity and/or the contour of the load introduction device, by the contour of the load introduction device and/or control cutouts arranged in the load introduction device, or which corresponds to same and/or is parallel to same, especially in view of the fiber composite material, and/or ii. until an amount of adhesive is injected, which results in an expansion, especially an intended expansion, of the adhesive, which is defined, especially at least partially, especially over at least 10% of the contour of the adhesive expansion in the cavity and/or the contour of the load introduction device, by the contour of the load introduction device and/or by control cutouts arranged in the load introduction device, especially boreholes, or which corresponds to same and/or is parallel to same, and/or iii. wherein the expansion of the adhesive between fiber composite material and load introduction device, is especially not hindered and/or limited by the load introduction device, fiber composite material, and/or other media and until the cavity is at least 50% filled with adhesive, wherein the at least one second pressure does not exceed the first pressure and the second time span does not exceed the first time span, or the loading via injection does not exceed the first injection loading, and the arrangement of fiber composite work piece and the load introduction device is secured at least for the duration of injection by securing the load introduction device, at least in relation to the forces which are exerted by the injection, relative to the fiber composite work piece by external means, especially at least one robot arm, at least one tensioning means and/or at least one holding clamp, at least one holding means and/or at least one pressing means.

The object is further attained by a method for connection of at least one fiber composite work piece, especially a longitudinal member of a vehicle, with a load introduction device, especially a metallic load introduction device, including a. provision of at least one fiber composite work piece, and provision of a load introduction device having at least one adhesion surface, b. positioning of the load introduction device relative to the at least one fiber composite work piece while using at least one sealant, so that at least one cavity is produced with a cavity volume between the at least one fiber composite work piece and the at least one adhesion surface of the load introduction device, wherein the cavity has n areas on which the cavity volume is not limited by the at least one adhesive surface of the load introduction device and the at least one adhesive surface of the at least one fiber composite work piece, wherein n is equal to or greater than one, and the length, especially measured perpendicular to the shortest connecting line between the fiber composite work piece and the adhesion surface of the load introduction device, of which n areas amount altogether to at least 5 cm, and so that the n areas are closed over at least 90% of the overall length of the n areas by at least one sealant, and that the at least one sealant is in contact with the at least one fiber composite work piece and/or the load introduction device, especially with the at least one adhesion surface of the load introduction device, and/or is configured as integral with the at least one fiber composite work piece and/or the load introduction device, and the arrangement of fiber composite work piece and load introduction device is secured so that the arrangement is suited to resist a first pressure in the cavity for at least a first time period and/or a first injection load resulting from the injection of adhesive into the cavity, without parting and especially without permanent alteration of the arrangement, and c. injection of adhesive with at least a second pressure in at least a second time period into the cavity, until the cavity is at least 50% filled with adhesive, wherein the at least one second pressure does not exceed the first pressure and the second time period does not exceed the first time period or the loading by injection does not exceed the first injection loading, and the arrangement of fiber composite work piece and load introduction device is secured by exerting a force on the load introduction device and/or the fiber composite work piece that compresses the sealant at least for the duration of the injection and/or the securing is effected by fixing, at least with respect to the forces that are exerted by the injection, the load introduction device relative to the fiber composite work piece by external means, especially at least one robot arm, at least one tensioning means and/or at least one holding clamp, at least one holding means, and/or at least one pressing means.

The object is further attained by an application of employment of at least one elongated elastic seal, for an injection adhesive bonding of at least two parts by injection of a second adhesive at an injection pressure, wherein the at least one elongated seal is arranged along the outer contour of the at least one adhesive surface, and/or along the outer contour of the load introduction device, wherein the at least one elongated elastic seal is used so that it comes to be, or is, in contact with both parts, and before the second adhesive is injected into the cavity, the parts are secured, that the cavity and/or the at least one elongated elastic seal resists the injection pressure, especially without alteration, wherein a force compressing the sealant is exerted at least for the duration of the injection and/or the securing is exerted by securing, at least in regard to the forces that are exerted due to the injection, of the load introduction device relative to the fiber composite work piece through external means, especially by means of a robot arm, at least one tensioning means and/or at least one holding clamp, at least one retaining means and/or at least one compressing means, and wherein the at least two parts are at least one fiber composite work piece and at least one load introduction device.

The object is further attained by a load introduction device for introducing a load into at least one fiber composite work piece in an adhesively bonded state with the at least one fiber composite work piece, wherein the load introduction device has at least one adhesion surface for adhesive bonding with the at least one fiber composite work piece by means of adhesive, and is characterized in that the load introduction device has at least one device for injection of adhesive through the load introduction device and its adhesion surface, and the geometry of the load introduction device is such that with arrangement of the adhesive surface over the surface of the fiber composite work piece at an interval between 1 and 15 mm, with injection of the adhesive through the at least one device for injection of adhesive, the adhesive is distributed between the load introduction device and fiber composite work piece so that its contour covers over at least 10%, especially at least 50% of the extension of the contour of the load introduction device in viewing the surface of the fiber composite work piece, and/or runs parallel to same without being limited, in its spreading between load the load introduction device and fiber composite work piece, by the load introduction device and/or other media and/or the geometry of the load introduction device is so configured that the contour of the load introduction device or of at least one of its sides and/or adhesive surface segments, squared in relation to its or their surface is greater than 18, especially greater than 25, especially greater than 50, especially greater than 115.

The object is further attained by a system comprising a fiber composite work piece and a load introduction device for load introduction into the at least one fiber composite work piece, wherein the at least one fiber composite work piece and the load instruction device are connected via an adhesive bonding with an adhesive volume, wherein the surface of the adhesive volume is limited in part on a first part of the surface of the adhesive volume of the at least one fiber composite work piece, and on a second part of the surface of the adhesive volume of the load introduction device, and on a third part the surface lies free is partially limited surrounded and wherein the third part amounts to at least 50%, especially at least 80%, of a difference value, especially in essence or totally equal to the difference value, wherein the difference value arises from that of the surface of the adhesive volume minus the first part of the surface of the adhesive volume and minus the second part of the surface of the adhesive volume and especially minus the surface of the adhesive volume that is together totally surrounded by the fiber composite material and the load introduction device.

The solution also differs from the method of injection adhesion, which is already known from other areas of the technology, for example from DE 1020 1 2012 298 A1. Through additional securing, not only can higher injection pressures be employed, and thereby quicker injections and more reliable adhesions be attained. Also, more exact positioning, arrangement and cavity sizes can be attained thereby. Especially with application of a first adhesive as a sealant, longer curing times can be accommodated with no further design measures, and the adhesive-bonded parts can also be moved before curing of the injected adhesive. In addition, complicated contours of the adhesive surfaces can be implemented without problems. Also, forces between the parts to be adhesively bonded, which for example can arise with employment of elastic sealants, can be avoided, if for example a beading and/or a first adhesive is employed as a sealant.

If a sealant and/or limitings, especially limitings that encircle or that limit the spreading of the adhesive to the edges of the load introduction device and/or adhesive surfaces, are to be dispensed with, a particularly simple injection can be carried out, which especially requires little preparation and/or makes possible an especially light, favorable product using fewer resources. Thus a very efficient procedure and a very efficient product can result. The adhesion process can be markedly simplified and the preparation requires less material use, less time and less labor.

In addition, this method permits the design of the load introduction device to be optimized, and it can be configured to be lighter, but by that means also more complicated, especially with a higher contour to surface ratio, without markedly increasing the expense for adhesive bonding. Through such configurations of the load introduction device they permit the loads and/or forces, with a reduced or equal weight of the load introduction device, to be introduced better, in more distributed fashion and/or more evenly (meaning distributed on a larger area, not necessarily a larger adhesive surface) in the fiber composite, and reduce the weight of the load introduction device.

In particular, bionically configured load introduction devices can be adhesively bonded by the method, simply, rapidly, and with savings in material. This increase in efficiency, reduced material use, reduced weight, lower costs, and an adhesive bonding process that is simplified and easily manipulated and able to be automated, are the advantages of this method.

Especially preferred is a load introduction device if its contour, the contour of at least one of its sides, with arched adhesive surfaces and/or adhesive surface segments, especially viewed in an unrolled depiction or in a projection, in which the adhesive surface or adhesive surface segment is maximally large, the contour of the load introduction device, the adhesive surface and/or the adhesive surface segment and/or the length of the contour of the adhesive squared in relation to its or their surface (the M coefficient in what follows) is greater than 18, especially greater than 25, especially greater than 40, especially greater than 60, especially greater than 115.

In particular the load introduction device and the adhesive used for bonding the load introduction device meet this requirement, and/or at least one side of the load introduction device used for adhesive bonding and the adhesive used for adhesive bonding of this side meet this requirement.

The contour and the surface, with flat adhesive surfaces and/or adhesive surface segments, is especially viewed perpendicular to the flat adhesive surfaces and/or adhesive surfaces segments and/or viewed especially in an unrolled depiction and/or with arched adhesive surfaces and/or adhesive surface segments or in a projection, in which the adhesive surface or adhesive surface segment is maximally large. Load introduction devices with multiple adhesive surface segments arranged to be angled to each other or with edges between them, especially with bends of 50° or more, can mentally be distributed on these edges and the components thus produced can be considered separately. Especially, at least 50% of the parts produced and/or 50% of the adhesive surface and/or load introduction device surface, can meet the requirements of the M coefficient. In especially advantageous fashion, the load introduction device can meet the requirement set for the coefficient for all parts and/or at least one of the parts, even without, and/or with only a partial (50%) consideration, of the edges produced by the separation, for the M coefficient.

In an unrolled depiction, the incisions produced by the unrolling are not taken into account as a contour. The unrolling is particularly so all of the surfaces and/or all of the adhesive surface segments used for the adhesive bonding come to lie on a common Euclidean plane, and/or the load introduction device causes all surfaces used for adhesive bonding and these connecting surfaces and/or all adhesive surface segments and these connecting and/or all surfaces of the load introduction device facing the fiber composite work piece to come to lie on a common Euclidean plane.

With the contour, not just the outer contour is considered, but rather also the share of the contour that is formed by cutouts. Especially considered as cutouts are such sections or surface segments of the load introduction device, which are not contacted by the adhesive and the material of which is configured to be thinner, especially at least by 20%, especially by at least 50%, than the part of the load introduction device that is in contact with the adhesive, and/or its average thickness. In one advantageous embodiment of the load introduction device in regard to the coefficient of contour squared and divided by the surface, it is especially harmless if the cutouts are screened by thin material pieces or sections. Such screenings, which make only insignificant contributions to the stability of the adhesive bonding and/or of the load introduction device, are preferably viewed as cutouts, and thus heighten the contour and lower the surface.

If we consider the named coefficient (M in what follows), the contour squared as divided by the surface some surfaces, we obtain the following values:

Rectangle with edge lengths a and b:

$$M=(2a+2b)^2/(a*b)$$

With the assumption of a=b, we obtain:

$$M=(16a+2/a^2=16$$

With the assumption of a=4b, we obtain:

$$M=100b^2/4b^2=25$$

A circle with a radius of r:

$$(2*pi*r)^2/(pi*r^2)=4*pi\sim12.5$$

A semicircle with a radius of r:

$$M=((pi*r)+(2*r))^2/(0.5*pi*r^2)=(2+pi)^2*r^2/(0.5*pi*r^2)=2*(2+pi)^2/pi\sim14$$

A ring with an inner radius of r1 and outer radius of r2:

$$M=(2*pi*(r1+r2))^2/(pi*(r2-r1)^2)=4*pi*(r1+r2)^2/(r2-r1)^2$$

Under the assumption of r2=2*r1 we obtain:
With r2=2*r1

$$4*pi*9*r1^2/r1^2=36*pi$$

Figure 6:
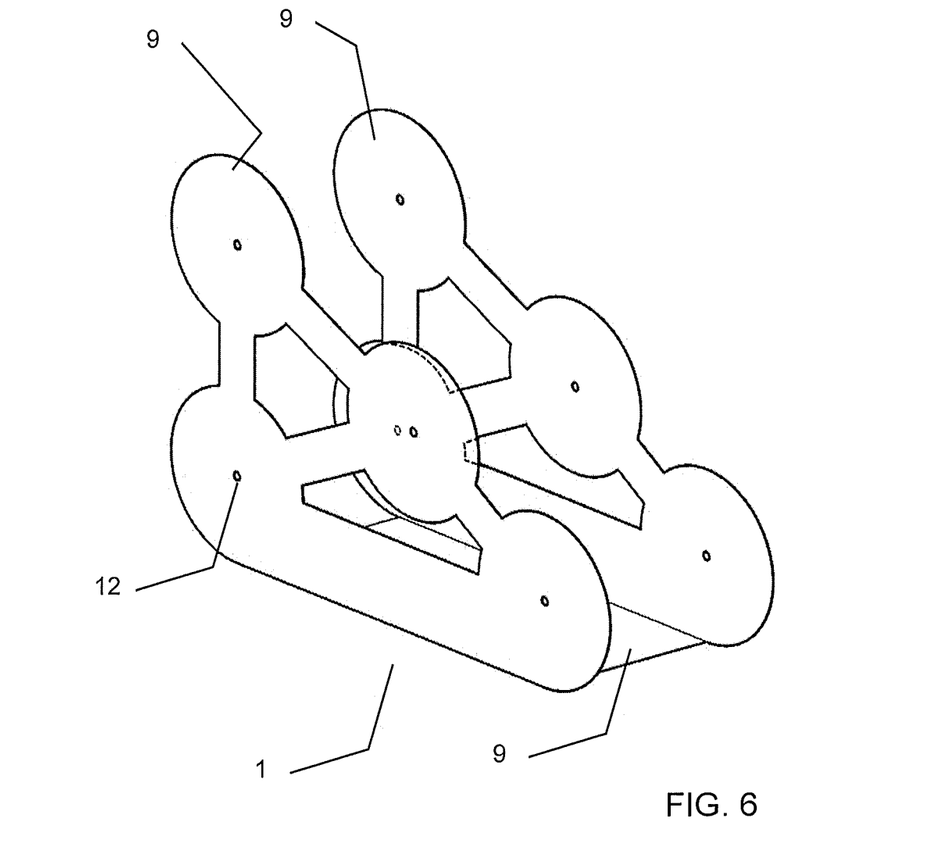
FIG. 6: A depiction of a load introduction device with two sides.
Figure 7:
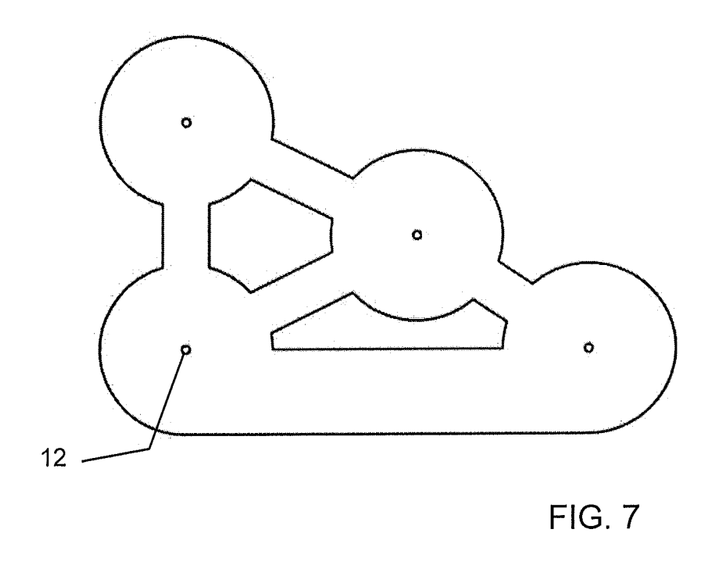
FIG. 7: A facing view of one of the sides of the load introduction device from FIG. 6.

If we consider the side shown in FIG. 7 of the more complex load introduction device, we obtain M=57.9, if we consider the load introduction device shown in FIG. 6 we obtain overall M=76.5. Upon consideration of one side without the lower (bending) edge, which is connected with the rest of the load introduction device, viewed as a contour, we obtain M=42.1.

Especially advantageously, connections can be formed between the areas used for adhesive bonding, or surface segments of the load introduction device with a greater material thickness.

Especially advantageously, the at least one, especially at least two, sides of the load introduction device have an extension in both directions of between 10 and 200 cm, and/or the load introduction device has one adhesive surface or sum of adhesive surface segments between 0.1 and 0.3 m^2. Especially advantageously, the load introduction device in two spatial directions has an extension between 10 and 200 cm, and/or in the third spatial direction it has an extension between 5 and 50 cm.

Among other things, the invention is solved by a method for connection of at least one fiber composite work piece especially a longitudinal member of a vehicle, with a load introduction device, especially a metallic load introduction device, including:

a. making available at least one fiber composite work piece, and making available a load introduction device having at least one adhesive surface, b. positioning the load introduction device relative to the at least one fiber composite work piece so that at least one cavity is produced between the at least one fiber composite work piece and the least one adhesive surface of the load introduction device, and securing the arrangement of fiber composite work piece and load introduction device in such a way that the arrangement is suited to withstand a first pressure in the cavity for at least a first time period and/or a first injection loading through injection of adhesive into the cavity, especially without permanent and/or temporary alteration of the arrangement, c. injection of adhesive at at least a second pressure in at least one second time period into the cavity, especially through a cutout or a plurality of cutouts, especially boreholes, in the load introduction device, i. until the adhesive reaches an expansion, especially one pre-planned, which is defined, especially at least partially, especially over at least 10% of the contour of the adhesive expansion in the cavity and/or the contour of the load introduction device, through which the contour of the load introduction device and/or control cutouts arranged in the load introduction device, or which corresponds to same and/or is parallel to same, especially in view of the fiber is composite material, and/or ii. until an amount of adhesive is injected, which results in an expansion, especially an intended expansion, of the adhesive, which is defined, especially at least partially, especially over at least 10% of the contour of the adhesive expansion in the cavity and/or the contour of load introduction device, by the contour of the load introduction device and/or by control cutouts arranged in the load introduction device, especially boreholes, or which corresponds to same and/or is parallel to same, and/or iii. wherein the expansion of the adhesive between fiber composite material and load introduction device, is especially not hindered and/or limited by the load introduction device, fiber composite material, and/or other media and until the cavity is at least 50% filled with adhesive, wherein the at least one second pressure does not exceed the first pressure and the second time span does not exceed the first time span or the loading via injection does not exceed the first injection loading, and the arrangement of fiber composite work piece and the load introduction device is secured at least for the duration of injection by securing the load introduction device, at least in relation to the forces which are exerted by the injection, relative to the fiber composite work piece by external media, especially at least one robot arm, at least one tensioning means and/or at least one holding clamp, at least one holding means and/or at least one pressing means.

The contour of the adhesive spreading is especially considered in the unrolled depiction of the load introduction device or in a view of the load introduction device and/or the particular considered side of the load introduction device and/or adhesive surface and/or adhesive surface segment and/or perpendicular to the adhesive spreading at the particular location. The incisions resulting through the unrolling are not to be regarded as a contour.

Thus, especially at each time from entry of the adhesive into the cavity as a whole, or per injection, injection opening, adhesive surface segment and/or cutout through which an injection occurs, the contour represents a closed line or two lines which extend or expand through the injection and/or increase their distance from each other and/or frame the adhesive within the cavity. With this consideration, by completely flowing around of obstacles, which has especially led to touching of at least two contour sections, lines of the contour and/or such lines of the contour, which are also contours of an obstacle, are left out of consideration. Through the touching each other of amounts of adhesive, or through flowing around obstacles that were injected through various injection openings, in the course of the injection, the number of lines that are formed by the contour, can change.

The contour can adjoin limitings, or beyond the adhesive spreading and/or on the outer not adjoin a limiting. Especially, at no time does the contour completely lie on a limiting. Especially, at the end of the injection and/or at every time, the contour maximally adjoins on a limiting over 50% of its extension.

Especially the cavity is filled with adhesive only up to a maximum of 95% of its extension and/or its volume.

Especially, adhesive is injected only in such quantity and/or only for as long, and/or adhesive is injected so that the adhesive does not leave the cavity, does not enter a ventilation opening, control opening and/or overflow opening, and/or does not fill such, and/or does not exit from any such.

What is especially meant by the spreading of the adhesive between the fiber composite material and the load introduction device, especially not being hindered and/or limited through the load introduction device, fiber composite material and/or other media, is that it is not limited to the extent that the adhesive cannot spread in any direction between the fiber composite material and the load introduction device anymore.

Especially, the spread of the adhesive in one, and especially two spatial directions, especially per adhesive surface segment, is not at any time and/or at the end of the injection, limited and/or prevented. The two spatial directions especially are arranged to be perpendicular to one another. The spread for example is hindered by local fillings or a local obstacle in the cavity, especially with extensions of less than 2 cm and/or 80%, especially less than 60%, of the extension of the cavity in the particular direction, which the adhesive can flow around. The spreading for example is limited by a wall-like boundary of the cavity, for example, which cannot be flowed around.

The object is also attained by a load introduction device which meets the requirements in regard to the coefficient as depicted above.

The invention is implemented, among other things, by a method for bonding at least one fiber composite work piece, especially a carrying member, especially a longitudinal or lateral member for a vehicle, with a load introduction device, especially a metallic load introduction device. The method includes the step of providing at least one fiber composite work piece and the provision of a load introduction device that has at least one adhesion surface. The load introduction device can be variously configured. It is suitable for introduction of loads, thus for example forces, into the fiber composite work piece. A load introduction device can for example be used to attach an axle on a vehicle longitudinal member made of fiber composite material. The fiber composite work piece is especially produced by a pultrusion method and/or especially has a cross section that is constant over its length.

Additionally the method includes the step of positioning the load introduction device relative to the at least one fiber composite work piece while using at least one sealant. The positioning occurs so that at least one cavity is produced, especially with a cavity volume between the at least one fiber composite work piece and the at least one adhesive surface of the load introduction device. A cavity can be fully enclosed. However, it can also have openings, especially at least one open area, especially an encircling one. A gap that results from the positioning of an adhesion surface of a load introduction device over a surface of a fiber composite work piece, can thus likewise be a cavity.

An adhesive surface is especially suited to be wetted with an adhesive, with the adhesive to bond the load introduction device with the fiber composite work piece. Especially an adhesive surface is designed flat. Especially, an adhesive surface has no kinks or edges.

The cavity that arises upon being positioned while using the at least one sealant, in particular has n areas in which the cavity volume is not limited by the at least one adhesive surface of the load introduction device and the at least one fiber composite work piece. With this, n is equal to one or more, and is the length, especially measured perpendicular to the shortest line connecting the fiber composite work piece and adhesive surface of the load introduction device, that of n areas together being at least 5 cm long.

In particular the positioning is carried out so that the n areas are sealed at least over 90% of the joint length of the n areas by at least one sealant.

Especially, apart from the n areas, the cavity is sealed, and thus, apart from the n areas, is totally enclosed by the fiber composite work piece and by the load introduction device, wherein the load introduction device or the fiber composite work piece can have openings either for injection and/or ventilation, but this is not obligatory.

The sealant is in contact with the at least one fiber composite work piece and the load introduction device, especially with the at least one adhesive surface of the load introduction device. The contact might be created only upon being positioned, and/or already exist prior, for example the sealant can already be pre-bonded with the load introduction device and/or the fiber composite work piece, and/or be a part of the load introduction device and/or the fiber composite work piece. This for example would be produced by a beading of the load introduction device, which then is brought into contact with the fiber composite work piece. Thus the sealant can also be achieved by form-locking and/or interlocking and/or complementary geometries, for example a beading or multiple beadings and/or recesses, especially also form-locking and/or interlocking and/or complementary geometries of the fiber composite work piece and/or load introduction device, which especially then can be brought into contact with each other. It can also suffice that the fiber composite work piece or load introduction device can be brought to a flat site with a corresponding geometry of the other of fiber composite work piece and load introduction device, for example a beading is brought in contact, and if necessary a sufficient force is applied to compress them together. It depends on whether a corresponding cavity is produced which, in the closed parts of the n areas (at least 90% of the overall area of n areas) prevents leaking out of adhesive upon injection, or largely prevents or at least retards this, especially retarding it so as to make possible and/or attain a reliable filling of the cavity with adhesive through injection.

Also the arrangement of fiber composite work piece and load introduction device is secured so that the arrangement is suited to resist an initial pressure in the cavity for at least an initial period of time without parting and especially with no permanent or especially also no temporary alteration of the arrangement. What is understood by a temporary alteration is one over a time period that is smaller than the setting time, processing time and/or curing time of the adhesive. The securing can be achieved in different ways. For example, as a sealant, an adhesive can be used, and the securing can be attained by curing of the adhesive. Also, through external media, for example robots, frames, retaining media and/or pressing media, the arrangement can be secured. The securing can also be done through shaping, by further components and other features, through reinforcement and/or a combination of these measures. There does not have to be an absolute or permanent securing; it is sufficient that the above-named requirements be met.

The method also includes the step of injecting adhesive into the cavity at at least one second pressure during at least one second time period, until the cavity is at least 50% filled with adhesive, with the at least second pressure not exceeding the first pressure and the at least second time period, especially each one individually and/or all jointly, not exceeding the first time period. The injection can also be interrupted repeatedly and/or be carried out through multiple injection openings simultaneously and/or with staggered times. The at least one second pressure can be produced by different pressures over the course of time and/or different injections. Especially, none of the second pressures exceeds the first pressure. In especially advantageous fashion, or alternatively, the loading through the at least one second pressure in the at least one second time period does not exceed the loading, which the secured arrangement of the at least one fiber composite work piece and the at least one load introduction device withstands without parting and especially without permanent or especially also temporary alteration of the arrangement. It is precisely in this that the relationship of pressures and time periods has its purpose.

In especially advantageous fashion, the at least one adhesive surface is completely wetted and/or covered with adhesive for bonding with the at least one fiber composite work piece, especially through injection and/or sealant.

In especially advantageous fashion, the cavity is 0.1 to 0.6 mm high, especially preferred 1 to 6 mm. The height is particularly measured along the shortest connecting line, especially at the site of height measurement, between the adhesive surface of the load introduction device and the fiber composite work piece. Especially it is measured perpendicular to the adhesive surface of the load introduction device and/or the surface of the fiber composite work piece. In especially advantageous fashion, the cavity height is at least approximately constant over 90% of the at least one adhesive surface.

In especially advantageous fashion, the at least n areas are not completely closed and the cavity has at least one, especially at least two, openings, especially in the n areas. In particular, apart from these openings and/or openings for injection and/or for ventilation of the cavity, the cavity is especially closed, especially in the load introduction device and/or the n areas.

In especially advantageous fashion, the first and/or second pressure is between 1 and 10 bar, especially between 5 and 10 bar. The second pressure can be constant in the volume stream and/or fluctuate. In especially advantageous fashion the length of the first and/or the second time period can be 1 second to 1 hour.

In especially advantageous fashion, sealants are employed by inserting sealants and/or by providing beadings on the load introduction device. The beadings can for example be configured as grooves, prominences, protrusions and/or stamping, especially as part of the load introduction device and/or being configured in integral fashion with it, for example manufactured from the same material and/or produced in one manufacturing process. The height of the beadings especially is 0.1 to 6 mm, especially preferred 1 to 6 mm. With compliant beadings, for example elastic ones, this is so chosen that when it adjoins or compresses, especially after the securing, it is at a height of 0.1 to 6 mm. The height is especially measured perpendicular to adhesion surfaces that are especially adjacent, especially adjoining ones. Especially the sealant is applied by arrangement of at least one elongated seal, especially along the outer contour of at least one adhesive surface of the load introduction device. For example, this can be an elastic sealing element. The outer contour of the adhesive surface can also be defined by the arrangement of the elongated seal. This is the case for example, if there is a large flat surface and of that a part is separated through the arrangement of the elongated seal. However, the outer contour of the adhesive surface can also be defined by the shape of the load introduction device, for example by edges, ends, protrusions, and/or recesses of the load introduction device.

The arrangement of fiber composite work piece and load introduction device is especially secured by exterior application of a force that compresses the sealant onto the load introduction device and/or the fiber composite work piece, at least for the duration of injection and/or by securing the load introduction device relative to the fiber composite work piece, at least in relation to the forces that are exerted by the injection. The forces that are exerted by the injection, are especially directed outward from the cavity. This for example in many arrangements it can suffice to exert a force perpendicular to the adhesion surface of the load introduction device onto the fiber composite work piece, to attain a securing.

In especially advantageous fashion, the sealant is applied by application or coating of adhesive. This adhesive, which is applied or coated as a sealant, is designated as the first adhesive, and the adhesive inserted by injection into the cavity as the second adhesive. In especially advantageous fashion, the arrangement of fiber composite work piece and load introduction device is secured by at least partial curing of the first adhesive while creating a rigid connection between the fiber composite work piece and the load introduction device, with the bonding being suited to resist the first pressure of the at least first injection in the cavity for at least the first time period without loosening of the bonding, especially with no permanent, and also especially with no temporary alteration of the arrangement. The curing is done to at least to the extent and/or duration until the above-named condition is met.

In especially advantageous fashion, for positioning the load introduction device relative to the at least one fiber composite work piece, at least one spacer is used, which is and/or comes to be arranged between the at least one fiber composite work piece and the at least one load introduction device. The spacer can be, or become, part of the sealant or especially be arranged in one of the n areas. The spacer can also be formed by a beading, and/or be a part of same. Through such a spacer, especially if a first adhesive is used as the sealant, a defined distance can be attained between the load introduction device and the fiber composite work piece, and thus a defined cavity height. In especially advantageous fashion, at least three spacers are used. In especially advantageous fashion, the at least one spacer is clamped to the load introduction device and/or adhesively bonded, or designed as a unit with same. A spacer is especially suited by its stretching to produce a defined minimum interval, in that it is arranged at least partially between the fiber composite work piece and the load introduction device. It is especially configured to be rigid in at least one, and especially in all, its extensions. In especially advantageous fashion, at least three spacers are and/or come to be so arranged that they are or come to be arranged not on a common straight line. In especially advantageous fashion, the at least three spacers are so arranged, or come to be so arranged that they are and/or come to be arranged on and/or at different adhesion surfaces and/or adhesion surface segments, especially are and/or come to be on different, especially non-parallel planes of the at least one adhesive surface. In especially advantageous fashion, at least one of the spacers has at least one opening through it for the injection of adhesive and/or for the escape of a medium, especially gas, especially air. In especially advantageous fashion, the at least one spacer is arranged on the edge of the at least one adhesive surface. In especially advantageous fashion, the at least one spacer is so configured that it has a maximum extension, especially width, especially in the direction of the length of the n areas, especially in the direction of a particular adjoining limit line of the at least one adhesive surface, of a maximum of 10 cm, especially of a maximum of 5 cm, and/or that in a cross section perpendicular to the shortest connection line between the load introduction device and the fiber composite work piece, an adhesive has a cross-sectional surface from 1 mm2 to 10 cm2 through the spacer and/or parallel to the at least one adhesive surface, especially the adjoining one.

In especially advantageous fashion, during the injection of the second adhesive, it becomes possible to ventilate the cavity, or this is carried out, especially through one or at least one of the non-closed pieces of the at least n areas and/or through an air-permeable opening in a spacer and/or the load introduction device. In especially advantageous fashion, after the injection, the n areas and/or the cavity are fully closed, especially with at least one plug. The cavity is closed after injection of the second adhesive if the cavities existing before the injection are closed on all outer areas. It is especially advantageous if the injection occurs while, in the cavity, in the volume not yet filled by adhesive, a pressure of less than 35 bar prevails and/or the injection commences at a pressure of less than 500 mbar in the cavity. It is especially advantageous if the injection is done so that air is compressed in the cavity and/or in a ventilation cavity connected with the cavity in air-permeable fashion, which especially is a part of the load introduction device. However an air-permeable connection can also be implemented by a simple opening, or a membrane, or similar arrangement. To make possible such an injection, the load introduction device especially has a ventilation cavity, which is connected in air-permeable fashion with the cavity and/or with the at least one adhesive surface of the load introduction device.

In especially advantageous fashion, at least three openings are provided in the cavity, and the injection occurs as a staggered injection, so that if a flow front of the adhesive which is injected through a first opening reaches a second opening and/or an area with an extent reaching up to 50 mm about the second opening, the injection through the first opening is ended and the injection through the second opening and/or a third opening continues, until a flow front of the adhesive injected through the second opening reaches a third opening or an area with an extent of up to 50 mm about the second opening. An area with an extent of up to 50 mm about an opening is defined by the volume of a sphere with a midpoint in the center of the opening and a radius of 50 mm which lies within the cavity. Thus it is defined by the sectional amount of the volume of the cavity and such a sphere.

Through such a staggered injection, especially with elongated cavities and/or large cavities, reliable injection and adhesion are possible, especially also at injection pressures as low as possible. In especially advantageous fashion, the method is implemented while employing a staggered injection, so that one, and especially each, opening, through which the injection is completed, is closed, especially by at least one plug. Especially the first opening is closed if the flow front of the adhesive has reached the second opening and/or has reached an area with an extent of up to 50 mm about the second opening. In especially advantageous fashion, the method is carried out using a staggered injection so that it is consecutively repeated multiple times, especially with progressive openings. Thus a staggered injection can be carried out through a plurality of openings, and especially a large cavity can be completely filled with adhesive, while the staging substantially raises the possible overall processing time to implement the at least one injection of the method with the given processing time of a quantity of adhesive vis-à-vis only one injection or one non-staggered injection.

In especially advantageous fashion, an invention-specific load introduction device is employed as the load introduction device. In especially advantageous fashion, a load introduction device has an attachment structure, especially for welding and/or screw connection of additional elements.

Especially, openings can be used both as ventilation and as injection openings. Thus for example, ventilation can also be done through an opening, through which simultaneously, or at a different time, an injection takes place.

Especially a beading can also be used as a fixator. By a beading, which can, for example, be configured as a stamping, a groove, bushing or a cam, a load introduction device can be secured, especially if the load introduction device and/or its adhesion surface is formed by a thin element, especially a sheet-like one.

Especially the load introduction device is configured in a single piece or of at least two components, which for example are connected in material locked fashion with each other. Especially at least the adhesive surfaces of the load introduction device, especially those which are employed for adhesive bonding with a fiber composite work piece, are jointly designed as a single piece, and especially are rigid.

The object is also attained by employing a first sealant, especially a first adhesive, for injection adhesive bonding of at least two parts by means of injection of a second adhesive at an injection pressure, with the first sealant being used for at least largely rigid positioning of the at least two parts, creating of a connection of the at least two parts and creation of a cavity between the at least two parts for the subsequent injection adhesive bonding with the second adhesive, with the first sealant used so that the first sealant comes in contact with both parts and is so chosen and/or before the second adhesive is or comes to be injected into the cavity is secured, especially reinforced and/or cured, so that the cavity and/or the first sealant withstands the injection pressure, especially with no permanent alterations, especially with no temporary ones, and in which with the at least two parts there is at least one fiber composite work piece and at least one load introduction device, especially with a metallic or sandwich structure, especially an invention-specific load introduction device.

Generally the sealant can be chosen and/or implemented as described above. Especially it can be formed by a beading, an elastic sealing element, especially an elongated seal, and/or a first adhesive. Also in regard to the load introduction device, especially what is presented above holds true. Regarding the injection pressure and all other features, in advantageous fashion what is presented above holds true for the application, the load introduction device, and the system.

The object is also attained by a load introduction device for admission of loads into at least one fiber composite work piece in an adhesively bonded state with the fiber composite work piece, in the fiber composite work piece, with the load introduction device having at least one adhesive surface for adhesive bonding with the fiber composite work piece by means of adhesive, and is characterized in that at least one device for injection of adhesive through the load introduction device, that at least one fiber composite work piece and/or the at least one spacer and its adhesion surface is provided, and/or at least one spacer is encompassed. What is presented above advantageously holds true in regard to the spacer and the load introduction device.

In especially advantageous fashion, the invention-specific load introduction device and/or the load introduction device of the method, the system and/or the application is so configured that the at least one adhesion surface comprises at least two adhesion surface segments, which are especially arranged opposite each other and/or between which the at least one adhesive surface has and/or encloses at least one, especially two, angles and/or edges, especially with angles between 60 and 120° and/or especially about parallel axes and/or especially with diametrically opposed turning directions and/or especially in the form of adjoining angles. Through one such configuration it becomes possible through the load introduction device to encompass two edges of the fiber composite work piece, for example, making possible a U-shaped surrounding and adhesive bonding in cross section. Thus the fiber composite work piece for example can be surrounded at least partially on three sides by the load introduction device.

Especially adhesive surfaces which lie on a common plane and/or a common regular surface are viewed as an adhesive surface segment, even if they are not provided with full-surface adhesive bonding, for example at multiple locations that are not contiguous. Thus for example round adhesive surfaces that lie in a plane and are connected by bars, as is the case with one side as shown in FIG. 7, are viewed as one adhesive surface, even if no adhesive is provided on the bars. If the adhesive surface segment encloses more than a 50° solid angle, especially for each 50° enclosed solid angle and the solid angle enclosed after each 50° solid angle adhesive surface segment after 50°, is to be subdivided into an additional adhesive surface segment to select a new projection.

In especially advantageous fashion, at least one ventilation cavity is contained in connection with at least one adhesive part surface and/or the at least one adhesive surface so that air is pushed from the at least one adhesive part segment and/or adhesive surface into the ventilation cavity and is compressed in same, especially to a pressure of at least 3 to 10 bar, especially 5 to 10 bar. Through such a configuration, it is possible to ventilate, even without an opening of the cavity to the outside.

The object is also attained by a system containing at least one fiber composite work piece and a load introduction device, especially an invention-specific one, for load introduction into the at least one fiber composite work piece, wherein the at least one fiber composite work piece and the load instruction device are connected via an adhesive bonding with an adhesive volume, wherein the surface of the adhesive volume is limited on a first part of the surface of the adhesive volume by the at least one fiber composite work piece, and on a second part of the surface of the adhesive volume by the load introduction device, and on a third part the surface lies free wherein the third part amounts to at least 50%, especially at least 80%, especially 95% of a difference value, especially in essence or totally equal to the difference value, wherein the difference value arises from that of the surface of the adhesive volume minus the first part of the surface of the adhesive volume and minus the second part of the surface of the adhesive volume and especially minus the surface of the adhesive volume that is together totally surrounded by the adhesive, the fiber composite material and the load introduction device.

The connection is especially rigid overall and especially not detachable. This can be implemented by the second adhesive bonding alone, or through the first adhesive means and through the second adhesive bonding. The first connection means can thus also solely represent a connection in the meaning of a bridging and/or a touching of the fiber composite work piece and of the load introduction device. A touching also includes joint configuration as a single piece with the fiber composite work piece and/or load introduction device.

Especially the advantageous developments that are presented above, are valid for the load introduction device, the fiber composite work piece, the connection means, the sealant, and other features.

An invention-specific load introduction device or a load introduction device of the method, the application and/or the system can in part be configured to be folded, deep drawn, curved (convex and/or concave). For attachment to an axle assembly, a power car, a lead car, a trailer, an underbody, a car, a traction battery and/or for other systems and components in a motor vehicle, rail-bound vehicle or special vehicle design, and/or in the "towed" field, customary systems and components can be configured and/or have connection options for these.

BRIEF DESCRIPTION OF THE SEVERAL VIEWS OF THE DRAWINGS

Further advantageous embodiments are shown purely as examples without limitation using the following figures. Shown are.

DETAILED DESCRIPTION

Figure 1:
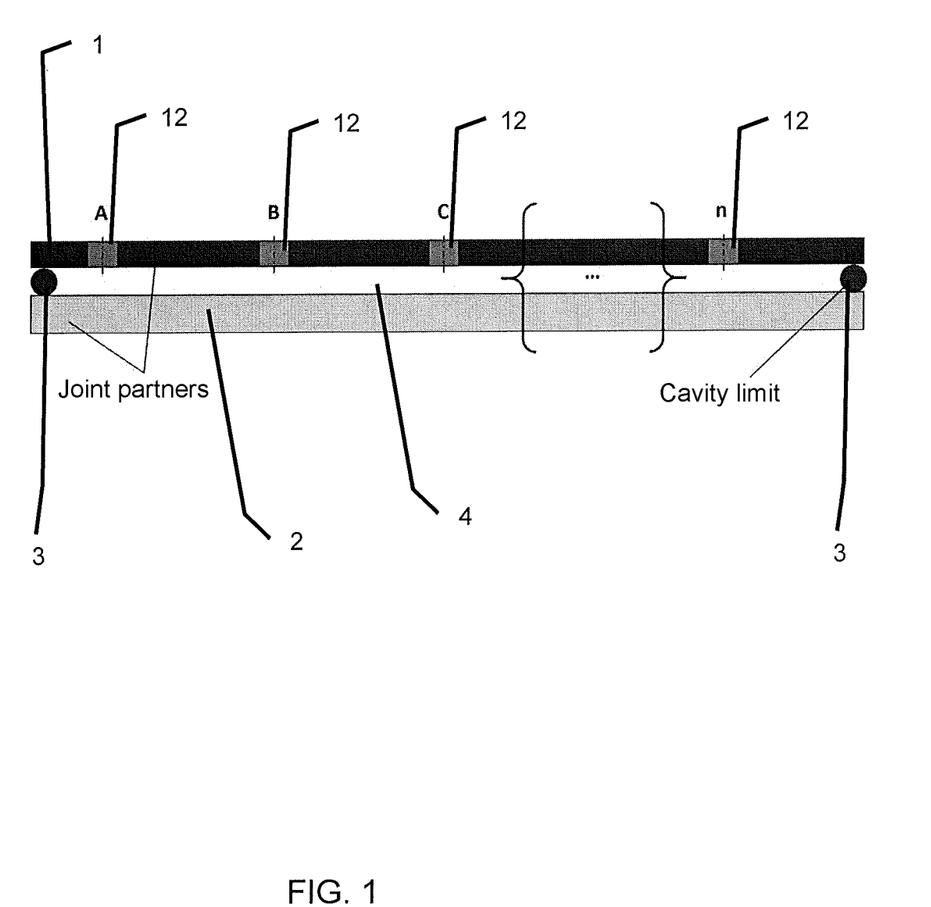
FIG. 1: a cross section through an arrangement of a load introduction device and of a Fiber composite work piece

FIG. 1 shows a load introduction device 1 and a fiber composite work piece made of fiber composite material 2 along with connection media 3, here designed as elastic, elongated round seals. Between the load introduction device, which has adhesive surfaces oriented downward, and the fiber composite work piece, a cavity 4 is formed. This is limited upwards by the load introduction device and downwards by the fiber composite work piece. The gap that is produced is closed outward by the seal 3. The load introduction device has injection and/or ventilation openings A, B, C to n. The curved brackets indicate that here more openings are placed but not shown, thus between opening C and n additional openings are found. Before an injection, especially first through opening A, from above pressure can be exerted on the load introduction device, so that the arrangement is secured. If the flow front of the adhesive that is injected through opening A, reaches opening B, injection through opening A is stopped and injection through opening B is continued until the adhesive reaches opening C. Then injection is carried out through opening C until the next opening is reached, and so on until the adhesive reaches opening n.

Figure 2:
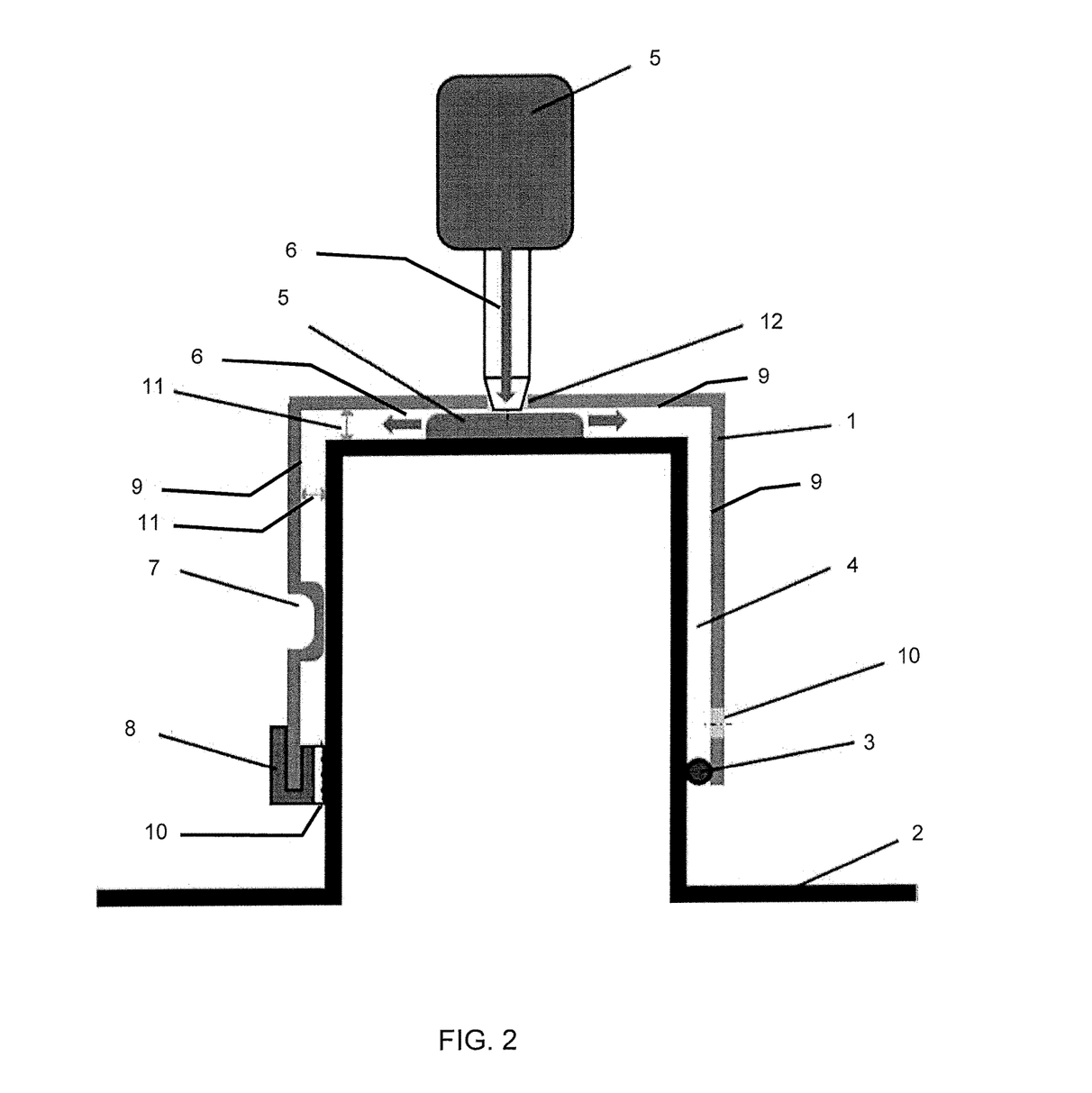
FIG. 2: a cross section through another arrangement of a load introduction device and a Fiber composite work piece

FIG. 2 shows a load introduction device 1 having three adhesion surface segments 9, which are arranged in a U-shaped cross section and a fiber composite work piece 2, which is at least partially surrounded on three sides by the load introduction device, along with a connection means 3, here designed as an elastic, elongated, round seal, and interrupted by a spacer 8 with a ventilation opening 10. Between load introduction device 1 and fiber composite work piece 2, a cavity 4 is formed. At the top this is limited by the load introduction device and by the fiber composite work piece. The resulting gap is closed toward the outside by seal 3. The height 11 of the cavity is larger on the upper adhesive surface segment than on the lateral adhesive surface segments 9. Load introduction device 1 has a beading 7 for adjusting the height 11 of the cavity. The height 11 of the cavity is also determined by seal 3 and spacer 8. The height of the cavity on upper adhesive surface segment 9 is adjusted by a spacer not shown in the depiction. For securing, the arrangement chosen here, due to its geometry, requires only a sufficient pressure from above on the load introduction device with a corresponding outer support under the fiber composite work piece. What is depicted is adhesive 5, which is injected in the direction of the adhesive expansion 6 through an injection opening 12 of load introduction device 1 into cavity 4. Beading 7 does not extend over the entire extent of load introduction device 1 parallel to the plane of the drawing, which makes it possible for adhesive to flow around the beading.

Figure 3:
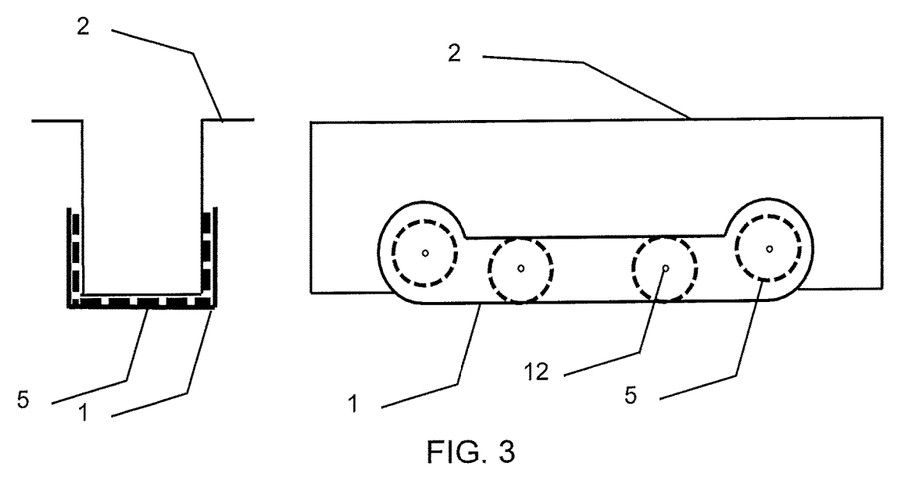
FIG. 3: A depiction of adhesive bonding without a sealant

FIG. 3 shows, a composite work piece (2) with an omega-shaped cross section, at left in cross section and at right in a view of the side wall extending in the left depiction from above downwards. A load introduction device (1) is arranged with an interval on the fiber composite work piece (2). In the cavity situated between, adhesive (5) is injected through nine injection openings in the form of boreholes. Of the injection openings, four are on each side, of which one is shown in the right depiction and one in the surface that connects the two sides of the load introduction device.

The adhesive is injected on the sides with the two outer injection openings so that the adhesive can spread without hindrance in the cavity and its contour extends in wide segments parallel to the contour of the load introduction device. The adhesive was injected on the sides with the two center injection openings so that the adhesive at least could spread out unhindered in all directions in the cavity and extend forward tangentially at a location (above) to the contour of the load introduction device, coinciding with same at this point. Also downward the adhesive can spread unhindered, if necessary it is turned by 90°, the spreading ends before the turning or it unites with the adhesive injected at the injection opening situated on the adjoining surface, so that a joint contour results, which, however, can spread unhindered.

Figure 4:
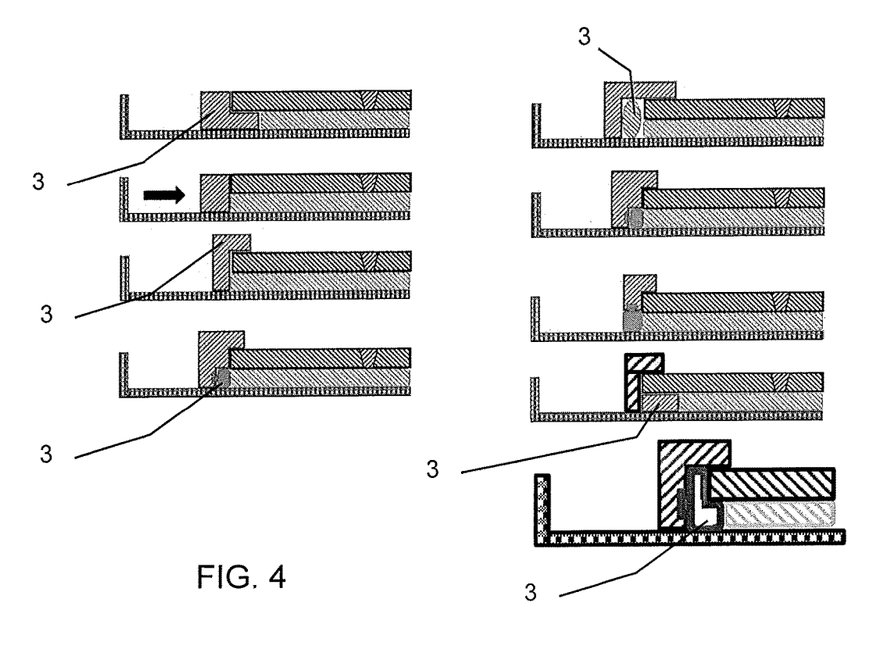
FIG. 4: A depiction of various sealants

FIG. 4 at left depicts as examples various designs of sealing elements, which especially are applied to enclose the contour of the adhesion surface and the load introduction device. In each case what is shown is a fiber composite work piece (below), a load introduction device (above), adhesive (between the fiber composite work piece and load introduction device) as well as a seal and part of a frame. In the uppermost depiction a sealing element, especially an elastic one, is seen, which extends between the fiber composite work piece and the load introduction device, and there can be secured by pressing the load introduction device in the direction of the fiber composite work piece. In the depiction below it a sealing element, especially an elastic one, is seen, compressed from without onto the load introduction device. In the depiction below that, a sealing element, especially an elastic one, is seen, that surrounds the load introduction device partially on the side facing away from the fiber composite work piece, and toward the left fully surrounds it, and thus it can secure the load introduction device in two spatial directions. By arranging such seals on four sides, the load introduction device can be secured in all the spatial directions, and also secured against the injection pressure so that under injection pressure it is secured in a position defined by the seal.

The lowest depiction shows a frame which partially surrounds the load introduction device on the side facing away from the fiber composite work piece, and completely surrounds it toward the left, and is secured on a seal, which limits the spreading of the adhesive. By arranging such seals on four sides, the load introduction device can be secured in all the spatial directions, and also secured against the injection pressure so that under injection pressure it is secured in a position defined by the seal.

At right in FIG. 4 is an example depiction of various embodiments of frames with inflatable sealing elements, each in an inflated state, which can especially be applied in surrounding fashion about the contour of the adhesion surface and the load introduction device. In each case is shown a fiber composite work piece (below), a load introduction device (above), adhesive (between the fiber composite work piece and load introduction device) as well as a frame with an inflated seal. The seal can extend only between the fiber composite work piece and load introduction device (second depiction from the bottom) or also next to the load introduction device (lowest depiction) or only next to the load introduction device and cavity (uppermost depiction), or also only adjoining the cavity (second depiction from the top and center depiction).

Figure 5A:
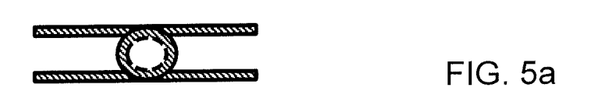
FIG. 5: A depiction of guidance of the adhesive through a spacer

FIG. 5*a* depicts an embodiment of a spacer, which can also be used to affect or guide the spreading of the adhesive. As shown here as an example, such can consist of two elongated rods, here shown straight and parallel, and at least one connection element connecting therewith, here a ring, which lies on the rods and is connected with them. Advantageously the spacer is secured at least partially or fully in its position and/or orientation by placement in a recess in the load introduction element, especially an injection opening. For further or complete securing, it can also be arranged onto the load introduction device adjoining in more one direction.

Figure 5B:
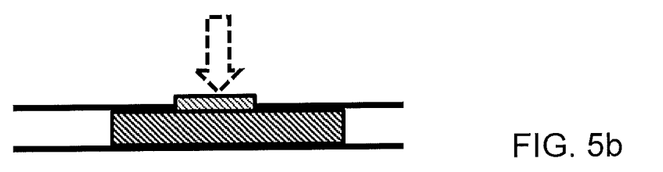

FIG. 5*b* depicts the position between fiber composite work piece (below) and load introduction device (above) and of the ring in an injection opening. The arrow illustrates that adhesive is injected through the ring.

Figure 5C:
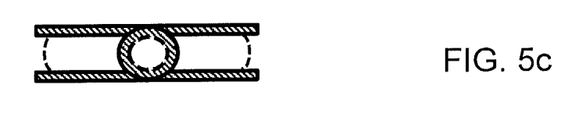
Figure 5D:
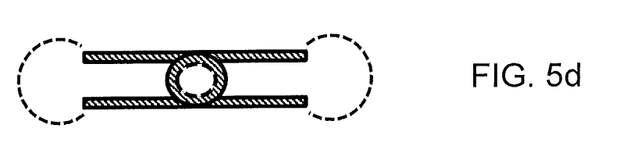
Figure 5E:
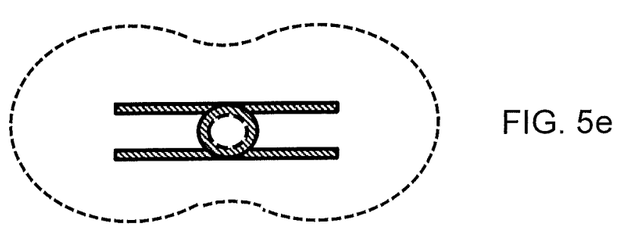

FIGS. 5*c* to 5*e* depict the unlimited spreading of adhesive (dashed lines) during the injection. First the spreading is hindered in two directions by the rods (FIG. 5*c*), then the adhesive flows around the obstacle that is formed by the spacer or its rods. Thereafter the adhesive can freely spread in all directions in the cavity (FIG. 5*e*). The contour is formed by the dashed lines and outlines of the rods. In FIG. 5*c* the contour is formed by the dashed lines (right and left) and the sections lying between of the inner sides of the rods. In FIG. 5*d*, the contour is formed by the dashed lines (right and left) and the inner sides of the rods. In FIG. 5*e*, the contour is formed by the dashed line and the contour of the rods surrounded by flow.

FIG. 6 shows a load introduction device for U-shaped enclosure of a fiber composite work piece as shown in FIG. 2. It has three flat adhesive surface segments. The end-placed or lateral sides of the load introduction device, of which one is shown in the vertical view of the adhesive surface segment in FIG. 7, has a ratio of contour squared and divided by the surface of M=57.9. If one considers the load introduction device shown in FIG. 6, one obtains M=76.5. When considering one side, as shown in FIG. 7, but without the lower (bending) edge, which is connected with the rest of the load introduction device, to be viewed as a contour, one obtains M=42.1. For this, the surrounding edge length has been summed with the edge length of the cutouts, the result was squared and divided by the surface of the side of the load introduction device as is perceived in FIG. 7. After arrangement on a fiber composite material, the load introduction device from FIG. 6 is adhesive bonded, especially one as shown in FIG. 2, by injection through the injection openings until the particular injected adhesive amounts form a contour that is identical with the rounded features of the load introduction device. The arrangement can be made by holding via a robot arm. Both sides of the load introduction device, of which one is shown in FIG. 7, then have four areas segregated from each other after the injections on one adhesive surface segment per side, on which they are adhesive bonded with adhesive. These areas are connected by the bars, which are included in the computation of the coefficient. In the configuration shown here the bars are also part of the adhesive surface segment, even when no adhesive bonding is done on them. However if one considers the coefficient of the adhesive per side, per side only the four circles that result through the four unimpeded injections would be allowed for, the contour of the four circles would be added, to square the result. This would then be divided by a number that results from addition of the surfaces of the four circles and squaring the result. If one considers this for the entire load introduction device, correspondingly eight circles would be involved.

LIST OF REFERENCE SYMBOLS

1 Load introduction device
2 Fiber composite work piece made of fiber composite material
3 seal
4 cavity
5 adhesive
6 adhesive expansion
7 beading
8 spacer
9 adhesive surface segment
10 ventilation opening
11 height of cavity
12 injection opening

The invention claimed is:

1. A method for connecting a fiber composite work piece and a load introduction device to one another, said method comprising steps of:
   positioning the fiber composite work piece and the load introduction device in an arrangement relative to one another, thereby providing a cavity between a surface of the fiber composite work piece and an adhesion surfaced provided on the load introduction device;
   temporarily securing the fiber composite work piece and the load introduction device to one another by external means, wherein the external means comprises one of at least one robot arm, at least one tensioning means, at least one holding clamp, at least one holding means, and at least one pressing means;
   injecting an adhesive into the cavity through a first opening defined in one of the load introduction device and the fiber composite work piece or between the load introduction device and the fiber composite work piece;
   wherein the injecting of the adhesive is at an application pressure for an application time-period, wherein the application pressure does not exceed a limit pressure and the application time period does not exceed a limit time period;

wherein the injecting of the adhesive occurs without temporary or permanent alteration of the position of the load introduction device and the fiber composite work piece relative to one another;

wherein the fiber composite work piece and the load introduction device are secured to one another for the duration of the injecting of the adhesive into the cavity; and expanding the adhesive within the cavity.

2. The method according to claim 1, wherein a second opening is defined in the load introduction device or in the fiber composite work piece or between the load introduction device and the fiber composite work piece, and the second opening is in fluid communication with the cavity, and wherein the expanding of the adhesive continues until a flow front of the adhesive reaches the second opening or the flow front of the adhesive reaches an area within about 50 mm from the second opening.

3. The method according to claim 1, wherein expanding of the adhesive continues until the cavity is at least 50% filled with adhesive.

4. The method according to claim 1 wherein injection of the adhesive occurs when air pressure in the cavity is less than 35 bar.

5. The method according to claim 4, wherein injection of the adhesive commences when air pressure in the cavity is less than 500 mbar.

6. The method according to claim 1, wherein the limit pressure is 10 bar.

7. The method according to claim 6, wherein the application pressure is between 1 bar and 10 bar.

8. The method according to claim 1, wherein the limit time period is 1 hour.

9. The method according to claim 8, wherein the application time period is between 1 second and 1 hour.

10. The method of claim 1, further comprising arranging at least one spacer between the fiber composite work piece and the load introduction device.

11. The method of claim 1, further comprising venting air from the cavity during the injection of the adhesive into the cavity.

12. The method of claim 1, wherein the injection of the adhesive into the cavity occurs while a pressure of less than 20 bar prevails in the cavity, and/or a pressure of less than 500 mbar prevails in the cavity before a start of the injection of the adhesive into the cavity.

13. The method of claim 12, wherein air is injected into the cavity or into a ventilation cavity connected in air-permeable fashion with the cavity, and the injected air is compressed within the cavity or within the ventilation cavity and the cavity.

14. The method of claim 1, wherein at least the first opening, a second opening, and a third opening to the cavity are defined in the load introduction device; and the injection of the adhesive into the cavity is carried out as a staggered injection procedure so that when a flow front of the adhesive that is injected into the cavity through the first opening reaches the second opening or reaches an area within 50 mm of the second opening, then continued injection of the adhesive into the at least one cavity occurs through the second opening or through the third opening and is continued until the adhesive injected through the second opening reaches the third opening or the adhesive injected through the third opening reaches the second opening.

15. The method according to claim 1, wherein the at least one fiber composite work piece is a longitudinal member of a vehicle, and wherein the load introduction device is a metallic load introduction device.

16. The method according to claim 1, wherein injecting the adhesive into the cavity continues until the adhesive expands over at least 10% of a length of a contour of the load introduction device.

17. The method according to claim 16, wherein a contour of the adhesive expansion is parallel to the contour of the load introduction device.

\* \* \* \* \*